(12) United States Patent  
Gu et al.

(10) Patent No.: US 9,284,211 B2
(45) Date of Patent: Mar. 15, 2016

(54) METHODS OF POST PROCESSING A GLASS SHEET

(71) Applicant: CORNING INCORPORATED, Corning, NY (US)

(72) Inventors: Jianqiang Gu, Shizuoka (JP); Jean-Marc Martin Gerard Jouanno, Painted Post, NY (US); William Brashear Mattingly, III, Painted Post, NY (US); Wenchao Wang, Ithaca, NY (US); Yoshiki Yamashita, Shizouka (JP); Rui Zhang, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/446,939

(22) Filed: Jul. 30, 2014

(65) Prior Publication Data

US 2015/0041435 A1 Feb. 12, 2015

Related U.S. Application Data

(60) Provisional application No. 61/863,509, filed on Aug. 8, 2013.

(51) Int. Cl.
*B44C 1/22* (2006.01)
*C03B 23/00* (2006.01)
(Continued)

(52) U.S. Cl.
CPC ............ *C03B 23/0066* (2013.01); *B65D 85/48* (2013.01); *B65G 49/062* (2013.01); *C03B 23/023* (2013.01); *C03C 15/00* (2013.01);
(Continued)

(58) Field of Classification Search
CPC .. C03B 22/00; C03B 23/0013; C03B 23/002; C03B 23/0066; C03B 23/023; C03B 23/02; C03B 23/03; C03C 21/002
USPC ............ 216/23, 24, 98, 99, 103, 104, 31, 97; 438/723, 753, 756
See application file for complete search history.

(56) References Cited

U.S. PATENT DOCUMENTS

| 3,147,860 A | 9/1964 | Kean, Sr. et al. ................ 206/62 |
| 3,628,934 A | 12/1971 | Duthoit ............................ 65/30 |

(Continued)

FOREIGN PATENT DOCUMENTS

| EP | 1829834 | 9/2007 |
| GB | 2225318 | 5/1990 |

(Continued)

OTHER PUBLICATIONS

PCT Application No. PCT/US2014/049332, filed Aug. 1, 2014, PCT International Search Report and Written Opinion, dated Nov. 24, 2014, 10 pages.

(Continued)

*Primary Examiner* — Lan Vinh
(74) *Attorney, Agent, or Firm* — John T. Haran

(57) ABSTRACT

Methods provide for post processing at least one flexible glass sheet with the step of providing the glass sheet with an initial shape. The method then further includes the step of flexing the glass sheet into a secondary shape from the initial shape. The method then further includes the step of post processing the glass sheet while biasing the glass sheet into the secondary shape. The method then still further includes the step of releasing the glass sheet to at least partially return to the initial shape.

20 Claims, 8 Drawing Sheets

(51) Int. Cl.

| | |
|---|---|
| *C03B 23/023* | (2006.01) |
| *C03C 15/00* | (2006.01) |
| *C03C 17/00* | (2006.01) |
| *C03C 21/00* | (2006.01) |
| *F26B 5/14* | (2006.01) |
| *B65G 49/06* | (2006.01) |
| *B65D 85/48* | (2006.01) |

(52) U.S. Cl.
CPC ............. *C03C17/002* (2013.01); *C03C 21/002* (2013.01); *F26B 5/14* (2013.01); *C03C 2218/31* (2013.01)

(56) References Cited

U.S. PATENT DOCUMENTS

| | | | |
|---|---|---|---|
| 4,368,822 A | 1/1983 | Kramer et al. | 211/41 |
| 4,489,835 A | 12/1984 | Tombal et al. | 211/41 |
| 4,512,473 A | 4/1985 | Thomaswick et al. | 206/454 |
| 4,899,891 A | 2/1990 | Sipilä et al. | 211/41 |
| 5,236,094 A | 8/1993 | Condie | 211/41 |
| 5,268,049 A * | 12/1993 | Marriott et al. | 156/99 |
| 5,641,076 A | 6/1997 | Englund | 211/41.14 |
| 7,708,517 B2 | 5/2010 | Nakamura et al. | 414/816 |
| 8,962,084 B2 * | 2/2015 | Brackley et al. | 427/294 |
| 2002/0070140 A1 | 6/2002 | Okamoto | 206/454 |
| 2004/0163988 A1 | 8/2004 | Yamada et al. | 206/454 |
| 2004/0195142 A1 | 10/2004 | Hayashi et al. | 206/545 |
| 2010/0236290 A1* | 9/2010 | Fukami et al. | 65/106 |
| 2011/0067447 A1* | 3/2011 | Zadesky et al. | 65/30.14 |

FOREIGN PATENT DOCUMENTS

| | | |
|---|---|---|
| JP | H06-138427 | 5/1994 |
| JP | H06138427 | 5/1994 |
| JP | 2002-299403 | 10/2002 |
| JP | 2003-100581 | 4/2003 |

OTHER PUBLICATIONS

J.M. Bradshaw and B. Taylor, "Ion-exchange strengthening of sheet glass", The Physics of Non-Crystalline Solids, 1992, p. 471-475.

* cited by examiner

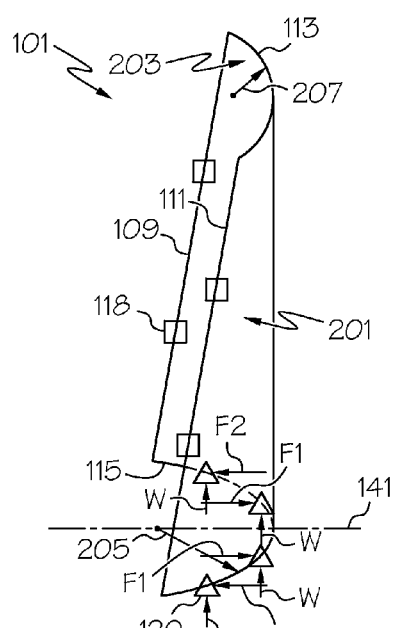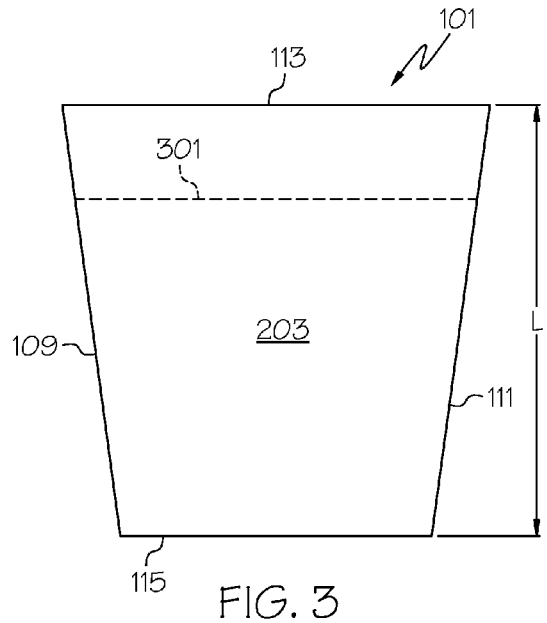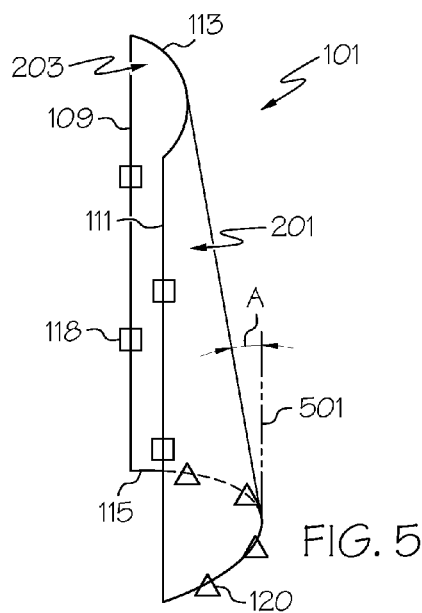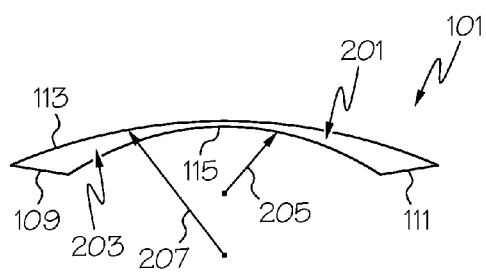

METHODS OF POST PROCESSING A GLASS SHEET

CROSS-REFERENCE TO RELATED APPLICATIONS

This application claims the benefit of priority under 35 U.S.C. §119 of U.S. Provisional Application Ser. No. 61/863,509 filed on Aug. 8, 2013 the content of which is relied upon and incorporated herein by reference in its entirety.

TECHNICAL FIELD

The present disclosure relates generally to methods for post processing a glass sheet and, more particularly, to methods of post processing a glass sheet while biasing the glass sheet into a secondary shape, such as a bent shape.

BACKGROUND

It is known to support a plurality of glass sheets during a post processing procedure such as supporting the glass sheets within a salt bath during an ion-exchange process. There is a need to support a plurality of increasingly thin glass sheets in a stable manner while post processing the glass sheets.

SUMMARY

The following presents a simplified summary of the disclosure in order to provide a basic understanding of some example aspects described in the detailed description.

In a first aspect, a method is provided for post processing at least one flexible glass sheet including a thickness defined between first and second major surfaces of the glass sheet. An outer periphery defined by first and second lateral edge portions of the glass sheet spans between top and bottom edge portions of the glass sheet. The method comprises the step (I) of providing the glass sheet with an initial shape; and then the step (II) of flexing the glass sheet into a secondary shape from the initial shape. The method then includes the step (III) of post processing the glass sheet while biasing the glass sheet into the secondary shape; and then the step (IV) of releasing the glass sheet to at least partially return to the initial shape.

In one example of the first aspect, the secondary shape comprises a bent shape.

In another example of the first aspect, the post processing of step (III) includes a processing step selected from the group consisting of: chemical strengthening, drying, washing, rinsing, coating, and acid etching the glass sheet.

In yet another example of the first aspect, biasing the glass sheet into the secondary shape of step (III) comprises compressing the first and second lateral edge portions toward one another. In one example, biasing the glass sheet into the secondary shape of step (III) does not include biasing either the top edge portion or the bottom edge portion into a curved shape.

In still another example of the first aspect, the secondary shape comprises a bent shape and biasing the glass sheet into the bent shape of step (III) comprises biasing at least one of the top edge portion and the bottom edge portion into a curved shape. In one example, biasing the glass sheet into the bent shape of step (III) does not include compressing the first and second lateral edge portions toward one another.

In yet another example of the first aspect, the method further comprises the step of supporting the glass sheet with a rack that biases the glass sheet into the secondary shape during step (III). In one example, the step (II) of flexing is performed prior to the step of supporting the glass sheet with the rack. In another example, the rack is used to flex the glass sheet into the secondary shape during step (II). In still another example, the rack compresses the first and second lateral edge portions toward one another to bias the glass sheet into the secondary shape during step (III), wherein, optionally, the top and bottom edge portions are not engaged by the rack to facilitate biasing of the glass sheet into the secondary shape during step (III). In yet another example, the rack engages at least one of the top edge portion and the bottom edge portion to bias the glass sheet into the secondary shape during step (III), wherein, optionally, the rack does not compress the first and second lateral edge portions toward one another to facilitate biasing of the glass sheet into the secondary shape during step (III).

In still another example of the first aspect, at least one glass sheet comprises a plurality of glass sheets, and wherein the method further comprises the step of spacing each of the plurality of glass sheets with respect to one another along an axis to create an axial stack of glass sheets.

In a further example of the first aspect, the secondary shape of step (II) comprises a C-shape wherein the first major surface is substantially convex and the second major surface is substantially concave, and the second major surface has a substantially concave lateral profile along a lateral cross section taken between the lateral edge portions of the glass sheet, wherein the substantially concave lateral profile exists along a length of the glass sheet between the top and bottom edge portions of the glass sheet. In one example, method further comprises the step of orienting the glass sheet such that an angle between the length of the glass sheet and a vertical axis is from about 0° to about 5°. In another example, the step of orienting the glass sheet tilts the glass sheet such that the angle is greater than 0° and less than or equal to about 5° with the second major surface of the glass sheet facing downwardly relative to the vertical axis. In still another example, the step of orienting the glass sheet tilts the glass sheet such that the angle is greater than 2° and less than or equal to about 5°.

In still a further example of the first aspect, the secondary shape of step (II) comprises a shape selected from the group consisting of: a C-shape, an S-shape and a W-shape.

In yet a further example of the first aspect, step (III) includes submerging the glass sheet within a salt bath during an ion-exchange process.

The first aspect may be carried out alone or with one or any combination of the examples of the first aspect discussed above.

BRIEF DESCRIPTION OF THE DRAWINGS

These and other aspects are better understood when the following detailed description is read with reference to the accompanying drawings, in which:

FIG. 2 is a perspective view of the glass sheet of FIG. 1 being biased in the bent shape;

FIG. 3 is a front view of the glass sheet of FIG. 2;

FIG. 4 is a top view of the glass sheet of FIG. 2;

FIG. 5 is a view of the glass sheet of FIG. 2 being tilted at an angle;

DETAILED DESCRIPTION

Figure 1:
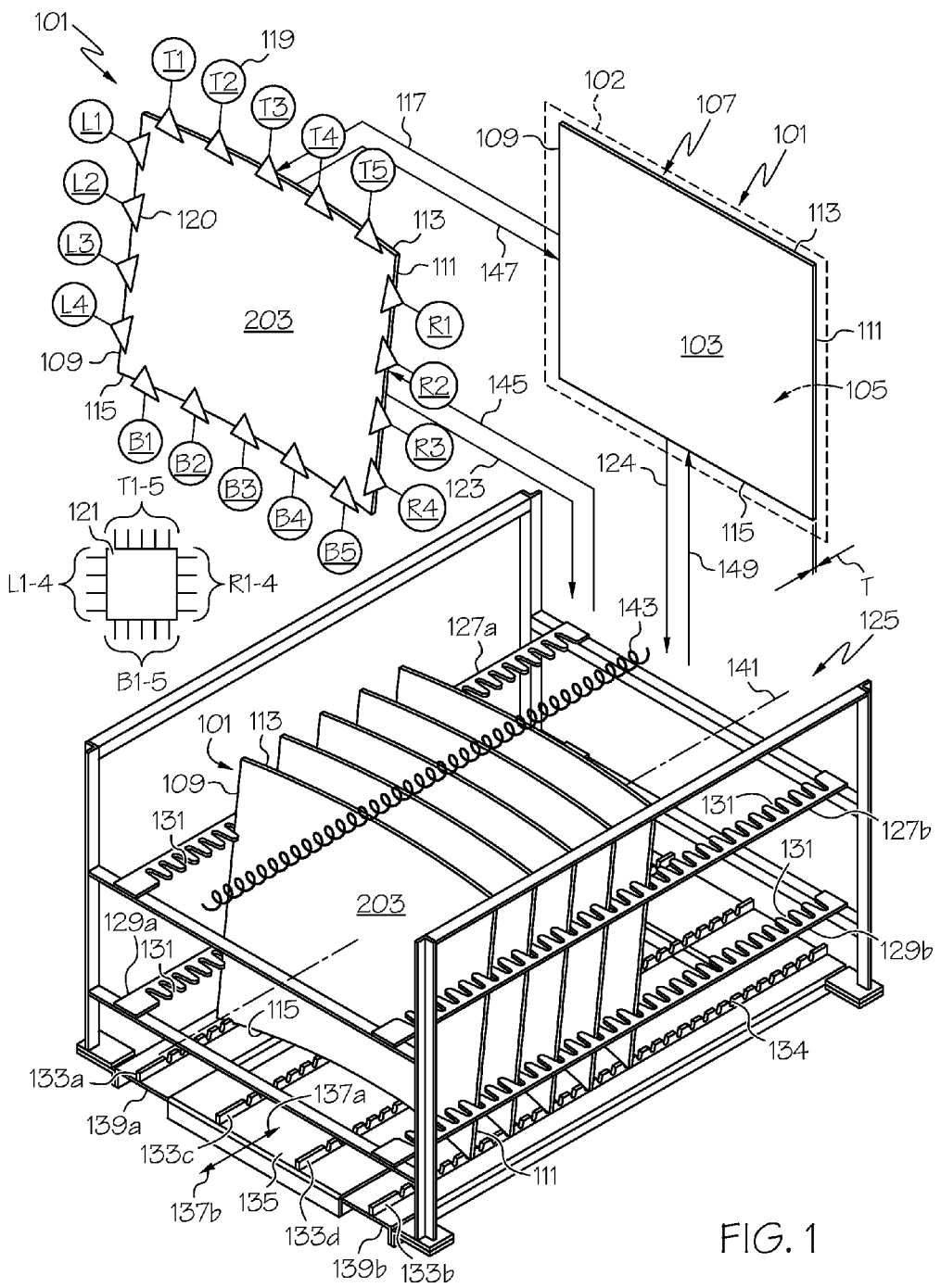
FIG. 1 is a schematic perspective view of example methods of biasing a glass sheet into a secondary shape, such as the illustrated bent shape.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Glass sheets fabricated in accordance with aspects of the disclosure may be used in a wide range of applications such as liquid crystal displays (LCDs), electrophoretic displays (EPD), organic light emitting diode displays (OLEDs), plasma display panels (PDPs), or the like. In some examples, glass sheets may be fabricated by a flowing molten glass to a forming body whereby a glass ribbon may be formed by a variety of ribbon forming processes, for example, slot draw, float, down-draw, fusion down-draw, or up-draw. The glass ribbon may then be subsequently divided to provide sheet glass suitable for post processing into a desired display application. Nowadays there is a growing interest for extremely high quality thin glass sheets. Methods of the present disclosure facilitate post processing of glass sheets while biasing the glass sheet into a bent shape as discussed more fully below.

FIG. 1 discloses a flexible glass sheet 101 provided with an initial substantially flat shape such that the glass sheet 101 extends along a substantially flat plane 102. The initial shape can comprise a relaxed state naturally achieved when the glass sheet 101 is not under the influence of outside forces. Due to the flexibility and resiliency of the glass sheet, within the elastic region of the flexible glass sheet, the flexible glass sheet may be temporarily bent into a secondary shape from the initial shape (e.g., relaxed shape). Once external forces are subsequently removed, due to the elasticity of the glass sheet, the glass sheet at least partially (e.g., entirely) returns to its initial shape. Although not shown, the glass sheet may include different initial shapes other than a substantially flat shape. For instance, the initial shape (e.g., relaxed shape) can comprise a curved shape, such as a C-shape or other shape configuration. The initial shape can be provided, for example, as the shape frozen into a glass ribbon during the process of forming the glass ribbon from a quantity of molten glass. Once frozen with the substantially flat shape, C-shape, or other shape, the glass ribbon may be subsequently separated into a plurality of glass sheets. The illustrated secondary shape can comprise a bent shape (e.g., C-shape, S-shape, W-shape, etc.) although the secondary shape may be substantially flat in further examples.

As shown in FIG. 1, the flexible glass sheet 101 includes a thickness "T" defined between a first major surface 103 and a second major surface 105 of the glass sheet 101. Various thicknesses can be used with concepts of the present disclosure and may be particularly helpful for thin glass having a thickness "T" of less than 1.2 mm, such as less than or equal to about 0.7 mm, such as less than or equal to about 0.5 mm, such as less than or equal to about 0.3 mm, such as less than or equal to about 0.1 mm. The glass sheet 101 includes an outer periphery 107 defined by a first lateral portion 109 and a second lateral portion 111 of the glass sheet 101 that spans between a top edge portion 113 and a bottom edge portion 115 of the glass sheet 101. The edge portions 109, 111, 113, 115 are each illustrated with a substantially straight profile although one or more of the edge portions may have other profiles such as a curved profile. Moreover, as shown, the edge portions meet at relatively sharp corners although rounded or other shaped corners may be provided in further examples. Still further, the glass sheet may be formed with an oval, oblong, circular or other shape wherein the edge portions comprise respective arcs that seamlessly transition with one another to form the respective shape.

Methods of the present disclosure can further comprise the step of flexing the glass sheet into a bent shape from the initial shape. In one example, a plurality of actuators may be used to bias the glass sheet at least partially, such as entirely, into the bent shape although manual flexing procedures may be carried out in further examples. As shown, schematically in FIG. 1, as indicated by arrow 117, the glass sheet 101 may be flexed into the secondary shape, such as the illustrated bent shape, from the initial shape by a plurality of actuators 119 under operation by a controller 121. For instance, the illustrated example shows each edge portion provided with a plurality of actuators 119 such as a left set of actuators L1-4 interacting with the first lateral edge portion 109, a right set of actuators R1-4 interacting with the second lateral edge portion 111, a top set of actuators T1-5 interacting with the top edge portion 113, and a bottom set of actuators B1-5 interacting with the bottom edge portion 115. Each edge portion 109, 111, 113, 115 is illustrated with four or five actuators although each edge portion may be provided with a single or any number of actuators in further examples. As shown, every edge portion is provided with actuators although only a single side or a plurality of sides less than all of the sides may be provided with actuators in further examples. The controller 121, if provided, can send signals to the actuators with communication lines 122 although wireless communication may be provided in further examples. The controller may be configured to provide an appropriate force and/or bending moment at corresponding edge locations 123 of the edge portions indicated by triangles throughout the figures.

In one example, the actuators may be provided as part of a robot configured to move the flexed glass sheet in the secondary shape to a post processing area and/or support the flexed glass sheet in the secondary shape while post processing the glass sheet. As indicated by the arrow 123 in FIG. 1, the flexed glass sheet may be optionally moved to be supported by a rack 125 in the secondary shape (e.g., bent shape) achieved prior to being introduced to the rack 125. As such, in any of the embodiments of the present invention, the step of flexing the glass sheet 101 into the secondary shape from the initial shape may optionally be performed at least partially, such as entirely, prior to the step of supporting the glass sheet 101 with the rack 125.

The rack 125 can therefore be configured to bias the glass sheet into the secondary shape, for example, by maintaining the bent shape obtained or initiated prior to introducing the glass sheet into the rack 125 as indicated by arrow 123. As shown in FIG. 1, one example rack 125 can include one or more lateral support rails. In the illustrated embodiment, the rack includes a first pair of lateral support rails 127a, 127b and a second pair of lateral support rails 129a, 129b. In some examples, a single pair of support rails may be used or more than two pairs of support rails depending on the particular application. Each support rail can include a plurality of inwardly open lateral slots 131 that are open to an inner support area of the rack 125. Pairs of slots 131 in the first pair of lateral support rails 127a, 127b may laterally aligned relative to one another to at least partially receive the corresponding lateral edge portions 109, 111 of the glass sheet 101. The rack 125 can also include shape rails 133a-d. Four shape rails 133a-d are illustrated although more or less shape rails may be provided in further examples. Each shape rail may include a plurality of notches 134 configured to apply a force against the bottom edge portion 115 of the glass sheet 101.

In one example method, the glass sheet 101 may be inserted into the rack 125 in the secondary shape as indicated by arrow 123. Once inserted, the bottom edge portion 115 is simultaneously received within respective notches 134 of each of the shape rails 133a-d. As shown in FIG. 1, the lateral edge portions 109, 111 are not completely inserted into the corresponding lateral slots 131. As such, the outer edges of the lateral edge portions 109, 111 are not compressed to achieve and/or maintain the secondary shape as indicated by the edge locations 118 of the squares shown in FIG. 2. However, the lateral edge portions 109, 111 are partially received by the respective slots 131 such that the lateral support rails 127a, 127b, 129a, 129b assist in supporting the weight and/or helping maintain the proper position of the glass sheet 101 within the rack 125. Of note, the edge locations 118 of the squares shown in FIGS. 2, 7 and 12-16 illustrate locations that help support the weight of the glass sheet and/or maintain the orientation of the glass sheet but do not provide a significant contribution to the secondary shape of the glass sheet.

FIG. 2 schematically illustrates the bending forces used to bias the glass sheet(s) 101 into the illustrated bent shape. Edge locations 120 represented by triangles in FIG. 2 correspond to locations of the bottom edge portion 115 that are received within respective notches 134 of the shape rails 139a-d. Biasing the glass sheet into the illustrated bent shape involves applying external forces to an edge portion, such as the bottom edge portion, of the glass sheet beyond the force necessary to support the glass sheet. Indeed, while forces may be applied by the rack 125 to help support the weight of the glass sheet, additional bending forces are applied outside of the reaction forces required to support the weight of the glass sheet. These bending forces are used, at least partially, to bias the glass sheet into the bent shape. FIG. 2 demonstrates one example where the bending forces F1, F2 are independent and distinct from the reaction forces "W" used to support the weight of the glass sheet 101. As shown, central shape rails 139c, 139d apply bending forces F1 in a first direction along an axis 141 of the rack 125. At the same time the outer shape rails 133a, 133b apply opposite forces F2 in a direction opposite to the direction of forces F1. As a result the bottom edge portion 115 is biased be maintained in an arc with a first radius 205. In some examples, bending forces are not applied to the top edge portion 113. In such examples, the top edge portion 113 may be substantially straight, or as shown, bent with a bend radius 207 that is greater than the bend radius 205 of the bottom edge portion 115. As such, methods of the present disclosure can optionally comprise the step of biasing at least one of the top edge portion and the bottom edge portion into a curved shape. Indeed, as discussed, the bottom edge portion may be biased into the curved shape. Moreover, the step of biasing the glass sheet into the secondary shape (e.g., bent shape) optionally does not include compressing the first and second lateral edge portions toward one another. Of note, the locations 120 along the edge portions represented by triangles in FIGS. 2, 5, 7 and 12-16 designate locations where forces and/or bending moments are applied to the edge portions of the glass sheet in order to flex the glass sheet into the secondary shape (e.g., bent shape) and/or bias the glass sheet into the secondary shape (e.g., bent shape) to facilitate maintenance of the secondary shape previously achieved when flexing the glass sheet into the secondary shape.

In an alternative method, the rack 125 may be used to flex the glass sheet at least partially, such as entirely, into the secondary shape (e.g., bent shape) from the initial shape. Indeed, the glass sheet 101 may be inserted into the rack 125 in the initial shape and then at least partially flexed by the rack 125 into the secondary shape as indicated by arrow 124. In one example, as shown, at least one shape rail may be designed to translate with respect to at least another shape rail to facilitate flexing of the bottom edge portion 115. For example, the bottom support structure of the rack 125 may include the illustrated central tray 135 that may be translated along directional arrows 137a, 137b relative to lateral base portions 139a, 139b. In use, the glass sheet 101 in the initial shape may be inserted such that the bottom edge portion 115 is simultaneously received within respective the notches 134 of each of the shape rails 133a-d. As shown in FIG. 1, the lateral edge portions 109, 111 are not completely inserted into the corresponding lateral slots 131 either in the initial shape or the illustrated bent shape. As such, the outer edges of the lateral edge portions 109, 111 are not compressed in either the initial shape or the secondary shape (e.g., bent shape). However, the lateral edge portions 109, 111 are partially received by the respective slots 131 such that the lateral support rails 127a, 127b, 129a, 129b assist in supporting the weight and/or helping maintain the proper position of the glass sheet 101 within the rack 125.

Next, the central tray 135 together with central shape rails 133c, 133d may be shifted along directional arrow 137a relative to the lateral base portions 139a, 139b and associated outer shape rails 133a, 133b. Such shifting of the central tray 135 along directional arrow 137a causes a corresponding translational movement of the central shape rails 133c, 133d relative to the outer shape rails 133a, 133b that can flex of the bottom edge portion 115 to cause the glass sheet to flex into the secondary shape (e.g., bent shape) from the initial shape. Once the rack 125 completes the procedure of flexing the glass sheet into the secondary shape from the initial shape, the rack 125 may then be used to maintain the secondary shape by biasing the glass sheet into the secondary shape, for example, as discussed with respect to FIG. 2 above. As such, the rack 125 may engage at least one of the top edge portion and the bottom edge portion to bias the glass sheet into the secondary shape. Indeed, as discussed above, the rack 125 may optionally engage the bottom edge portion 115 to bias the glass sheet into the secondary shape. Moreover, optionally, the rack 125 does not compress the first and second lateral edge portions 109, 111 toward one another to facilitate biasing of the glass sheet 101 into the secondary shape.

Whether or not the step of flexing the glass sheet into the secondary shape occurs before inserting the glass sheet into the rack or after inserting the glass sheet into the rack, the rack 125 may be used bias the glass sheet into the secondary shape (e.g., bent shape) to maintain the glass sheet in the resulting secondary shape while supporting the weight of the glass sheet in the secondary shape. As shown in FIG. 2, the secondary shape of the glass sheet 101 can optionally include a bent shape comprising a C-shape wherein a first major surface 201 is substantially convex and a second major surface 203 is substantially concave. As apparent in FIGS. 2-4 and as referenced in FIG. 3, the second major surface 203 has a substantially concave lateral profile 301 along a lateral cross section taken between the lateral portions 109, 111 of the glass sheet, wherein the substantially concave lateral profile 301 exists along a length "L" of the glass sheet 101 between the top and bottom edge portions 113, 115 of the glass sheet 101.

Providing the glass sheet with a bent shape, such as the C-shape, can help increase the rigidity the glass sheet which can be particularly helpful in relatively large sheets for example, having maximum dimensions (e.g., diagonal dimensions) of greater than about 114 cm (about 45 inches), greater than about 152 cm (about 60 inches), greater than about 191 cm (about 75 inches), greater than about 229 cm (about 90 inches) or more and/or sheets with thin thicknesses such as thicknesses of less than 1.2 mm, such as less than or equal to about 0.7 mm, such as less than or equal to about 0.5 mm, such as less than or equal to about 0.3 mm, such as less than or equal to about 0.1 mm. Indeed, as the thickness of the glass sheet is reduced and/or the maximum dimension of the glass sheet is increased, it becomes more flexible and therefore more likely to buckle under its own weight. Bending the glass sheet in accordance with aspects of the disclosure can help increase the rigidity of the glass sheet to facilitate reliable positioning of the glass sheet during a post processing procedure. Indeed, the increased rigidity of the glass sheet obtained by flexing the glass sheet into the bent orientation can help orient the glass sheets to extend upwardly without danger of buckling of the glass sheets. Moreover, in further examples, the secondary shape may have a flat shape or other shape that is different from the initial shape. Elastically deforming the glass sheet into the secondary shape (e.g., flat shape) can create internal stresses within the glass sheet that may act to increase the rigidity of the glass sheet. As such, for instance, the glass sheet may have an initial bent shape and then the glass sheet may be elastically deformed into a secondary shape such as a substantially flat shape.

Figure 6:
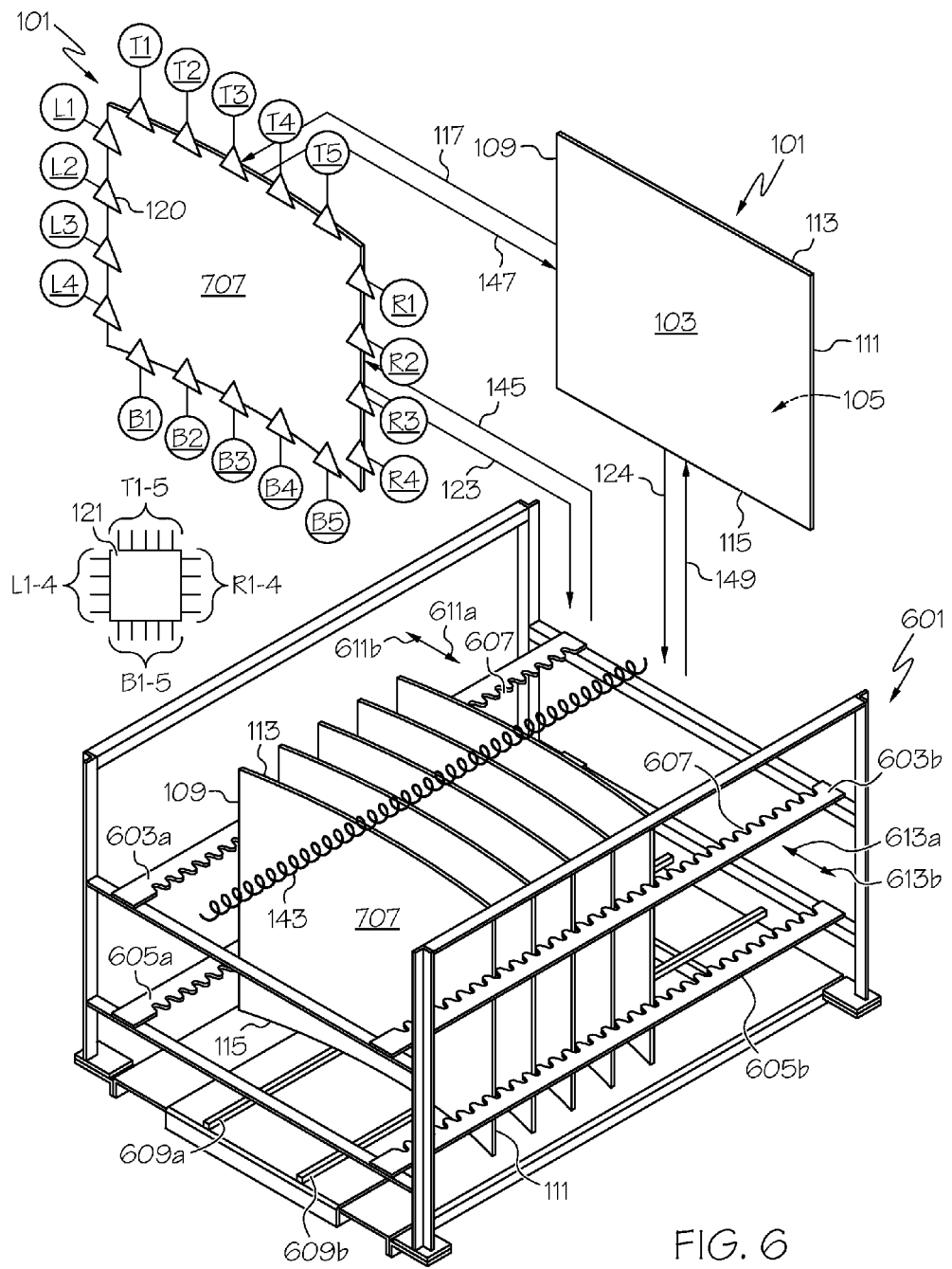
FIG. 6 is a schematic perspective view of further example methods of biasing a glass sheet into a secondary shape, such as the illustrated bent shape.

Furthermore, as the glass sheets have a stable shape, a plurality of glass sheets may be stacked relatively close to one another without the glass sheets contacting one another that may result in corresponding damage to the glass sheets. For example, as shown in FIGS. 1 and 6, a plurality of glass sheets may be supported by the racks 125, 601 in the bent shape (or other secondary shape) while spacing each of the plurality of glass sheets with respect to one another along the axis 141 of the rack to create an axial stack of glass sheets. As shown, the stack can comprise a horizontal stack although the stack may extend at an angle in further examples.

Still further, as shown in FIG. 1, an optional spacing device, such as the illustrated coil spring 143, may be used to help space the upper, otherwise free ends, of the glass sheets from one another to bias the top edge portions 113 of the glass sheets from contacting one another. Indeed, the top edge portions 113 of each glass sheet may be received in a corresponding loop of the coil spring to seat and removably attach the coil spring to the top edge portions 113 of the glass sheet.

FIG. 6 discloses another example rack 601 that, like the rack 125 of FIG. 1, may be used to bias the glass sheet 101 into the secondary shape (e.g., bent shape). The example rack 601 can include one or more lateral shape rails. In the illustrated embodiment, the rack 601 includes a first pair of lateral shape rails 603a, 603b and a second pair of lateral shape rails 605a, 605b. In some examples, a single pair of lateral shape rails may be used or more than two pairs of lateral shape rails depending on the particular application. Each lateral shape rail can include a plurality of inwardly open lateral slots 607 that are open to an inner support area of the rack 601. Pairs of slots 607 in the first pair of lateral shape rails 603a, 603b may laterally aligned relative to one another to at least partially receive the corresponding lateral edge portions 109, 111 of the glass sheet 101. The rack 601 can also include support rails 609a, 609b. Two support rails 609a, 609b are illustrated although more or less support rails or even no support rails may be provided in further examples.

In one example method, the glass sheet 101 may be inserted into the rack 601 in the secondary shape (e.g., bent shape) as indicated by arrow 123. Once inserted, the bottom edge portion 115 can be supported by support rails 609a, 609b that can support a significant portion or all of the weight of the glass sheets 101. The support rails do not include notches, but may only perform a support function as indicated by the edge locations 118 represented by squares on the bottom edge portion 115 shown in FIGS. 7 and 12-16. As shown in FIG. 6, unlike the embodiment of FIG. 1, the lateral edge portions 109, 111 are completely inserted into the corresponding lateral slots 607. As such, the outer edges of the lateral edge portions 109, 111 may be compressed by the lateral shape rails to bias the glass sheet into the secondary shape (e.g., bent shape). The lateral shape rails can assist in supporting the weight and/or helping maintain the proper position of the glass sheet 101 within the rack 601 but also applies bending forces (e.g., compression forces) outside of the reaction forces required to partially support the weight of the glass sheet or orient the glass sheet. As such, methods of the disclosure can use the rack 601 to compress the first and second lateral portions 109, 111 toward one another to bias the glass sheet into the secondary shape. Optionally, as shown, the top and bottom edge portions 113, 115 are not engaged by the rack to facilitate biasing of the glass sheet into the secondary shape. Rather, as indicated by the squares associated with the bottom edge portion 115 in FIG. 7, the bottom edge portion 115 is only engaged by the rack to facilitate support of the weight of the glass sheets 101.

Figure 7:
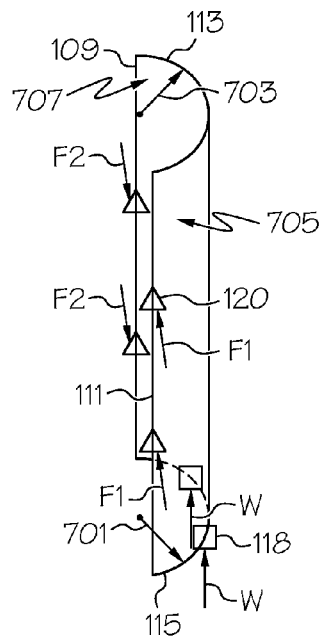
FIG. 7 is a perspective view of the glass sheet of FIG. 6 being biased in the bent shape.
Figure 8:
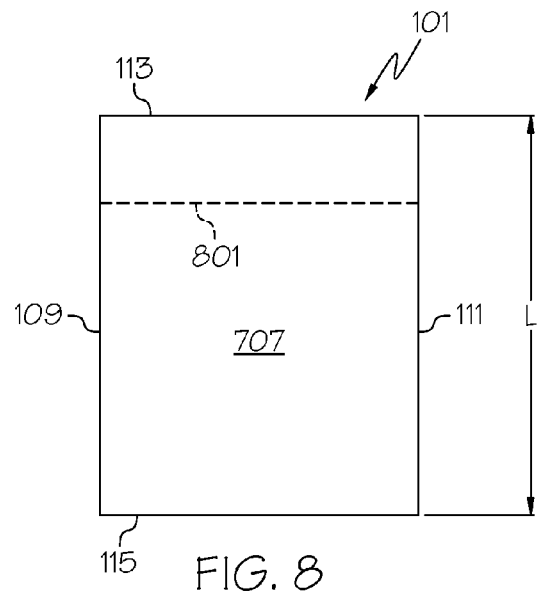
FIG. 8 is a front view of the glass sheet of FIG. 7.
Figure 12:
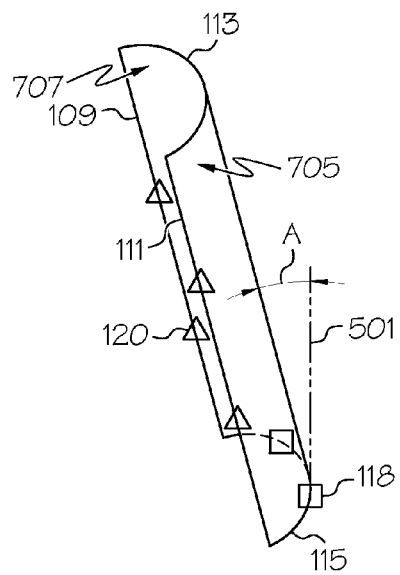
FIG. 12 is a view of the glass sheet of FIG. 7 being tilted at an angle.
Figure 9:
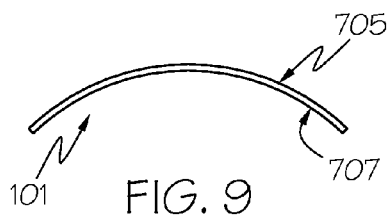
FIG. 9 is a top view of the glass sheet of FIG. 7.

FIG. 7 schematically illustrates the bending forces used to bias the glass sheet(s) 101 into the illustrated bent shape. Edge locations 120 represented by triangles in FIG. 7 correspond to locations of the lateral edge portions 109, 111 that are received within respective notches 607 of the shape rails 603a, 603b, 605a, 605b. Biasing the glass sheet into the bent shape involves applying external forces to an edge portion, such as the lateral edge portions, of the glass sheet beyond the force necessary to support or maintain orientation of the glass sheet. Indeed, while forces may be applied by the rack 601 to help support the weight and/or orientation of the glass sheet, additional bending forces are applied outside of the reaction forces required to support the weight of the glass sheet and/or orient the glass sheet. These bending forces are used, at least partially, to bias the glass sheet into the bent shape. FIG. 7 demonstrates one example where the bending forces F1, F2 are independent and distinct from reaction forces "W" used to support the weight of the glass sheet 101. As such, the method can include the step of supporting the glass sheet with the rack that biases the glass sheet into the bent shape. As shown, first side rails of the first and second pairs of shape rails are configured to apply forces F1 while second side rails of the first and second pairs of shape rails are configured to apply forces F2 opposite to forces F1 to compress the lateral edge portions 109, 111 together. Biasing the lateral edge portions 109, 111 together allows the glass sheet 101 to be biased into the bent shape shown in FIGS. 7-9.

As a result, the glass sheet can be biased into a bent shape where the bottom edge portion 115 is maintained in an arc with a first radius 701 while the top edge portion 113 is maintained in an arc with a second radius 703. In some examples, bending forces may be applied such that the first radius 701 is substantially the same as the second radius 703.

In an alternative method, the rack 125 may be used to flex the glass sheet at least partially, such as entirely, into the secondary shape (e.g., bent shape) from the initial shape. For example, the glass sheet 101 may be inserted into the rack 601 in the initial shape and then at least partially flexed by the rack 601 into the bent shape as indicated by arrow 124. In one example, as shown, at least one shape rail may be designed to translate with respect to at least another shape rail to facilitate flexing glass sheet into the bent shape. For example, first side rails 603a, 605a may be designed to move relative to second side rails 603b, 605b to compress the lateral edge portions 109, 111 together to flex the glass sheet from the initial shape to the bent shape. In one example, both the first side rails 603a, 605a may be configured to translate relative to the other portions of the rack along direction 611a. In addition or alternatively, both of the second side rails 603b, 605b may be configured to translate relative to the other portions of the rack along direction 613a. As such, the rack 601 can be configured such that the first side rails and or the second side rails can be translated inwardly along direction 611a, 613a toward an interior support area of the rack to compress the lateral edge portions 109, 111 together to bias the glass sheet into the bent shape.

Whether or not the step if flexing the glass sheet into the secondary shape occurs before inserting the glass sheet into the rack 601 or after inserting the glass sheet into the rack, the rack 601 may be used to bias the glass sheet into the secondary shape to maintain the glass sheet in the resulting secondary shape while supporting the weight of the glass sheet. For example, as shown, biasing the glass sheet into the secondary shape can comprise compressing the first and second lateral edge portions 109, 111 toward one another. Moreover, as shown, the biasing glass sheet into the secondary shape (e.g., bent shape) may not include the step of biasing either the top edge portion or the bottom edge portion into a curved shape.

Figure 13:
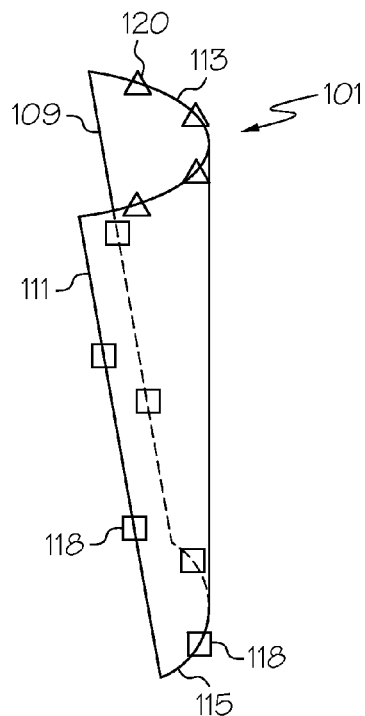
FIG. 13 is a perspective view of a glass sheet being biased into another bent shape.
Figure 14:
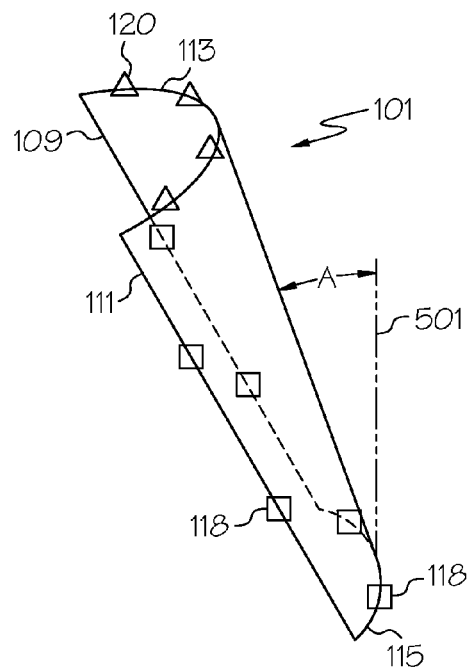
FIG. 14 is a view of the glass sheet of FIG. 13 being tilted at an angle.

FIGS. 13-16 illustrate alternative examples of how to bias the glass sheet into the illustrated bent shape. With reference to FIG. 13, as represented by triangles, bending forces may be applied to the top edge portion 113 to achieve the bent shape of the glass sheet 101. As indicated by squares on the bottom edge portion 115, support forces may be applied to the bottom edge portion 115 to help support the weight of the glass sheet 101. Likewise, as indicated by the squares on the lateral edge portions 109, 111, non-bending support forces may be applied to the edge portions to facilitate maintenance of the appropriate tilt angle and/or partially support the weight of the glass sheet. FIG. 14 is identical to FIG. 13 but shows the glass sheet 101 being oriented at angle "A" discussed more fully below.

Figure 15:
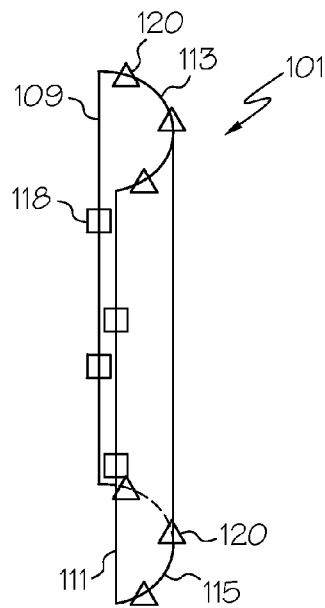
FIG. 15 is a perspective view of a glass sheet being biased into another bent shape.
Figure 16:
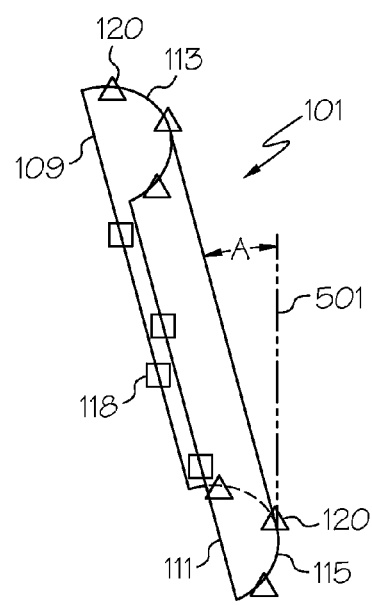
FIG. 16 is a view of the glass sheet of FIG. 15 being tilted at an angle.

With reference to FIG. 15, as represented by triangles, bending forces may be applied to the top edge portion 113 and the bottom edge portion 115 to achieved the bent shape of the glass sheet 101. As indicated by squares on the lateral edge portions 109, 111, non-bending support forces may be applied to the edge portions to facilitate maintenance of the appropriate tilt angle and/or partially support the weight of the glass sheet. FIG. 16 is identical to FIG. 15 but shows the glass sheet 101 being oriented at angle "A" discussed more fully below.

As shown in FIG. 7, the bent shape of the glass sheet 101 can optionally include a C-shape wherein a first major surface 705 is substantially convex and a second major surface 707 is substantially concave. As apparent in FIGS. 7-9 and as referenced in FIG. 8 the second major surface 707 has a substantially concave lateral profile 801 along a lateral cross section taken between the lateral portions 109, 111 of the glass sheet, wherein the substantially concave lateral profile 801 exists along a length "L" of the glass sheet 101 between the top and bottom edge portions 113, 115 of the glass sheet 101. As shown, in some examples, the concave lateral profile 801 can have a radius that is substantially the same along the length "L" of the glass sheet 101 between the top and bottom edge portions of the glass sheet.

Figure 10:
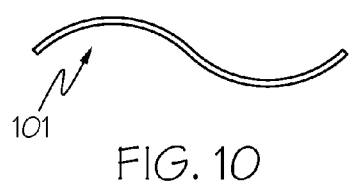
FIG. 10 is a top view of a glass sheet being biased in an S-shape.
Figure 11:
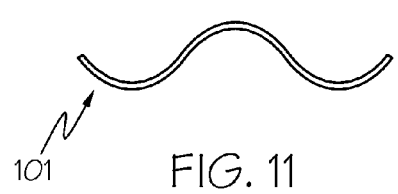
FIG. 11 is a top view of a glass sheet being biased in a W-shape.

As discussed above, the bent shape of the glass sheet 101 can comprise a C-shape that will facilitate increasing the rigidity of the glass sheet. In further examples, the bent shape can comprise an S-shape as shown in FIG. 10, a W-shape as shown in FIG. 11, or other shapes that will increase the rigidity of the glass sheet.

Figure 17:
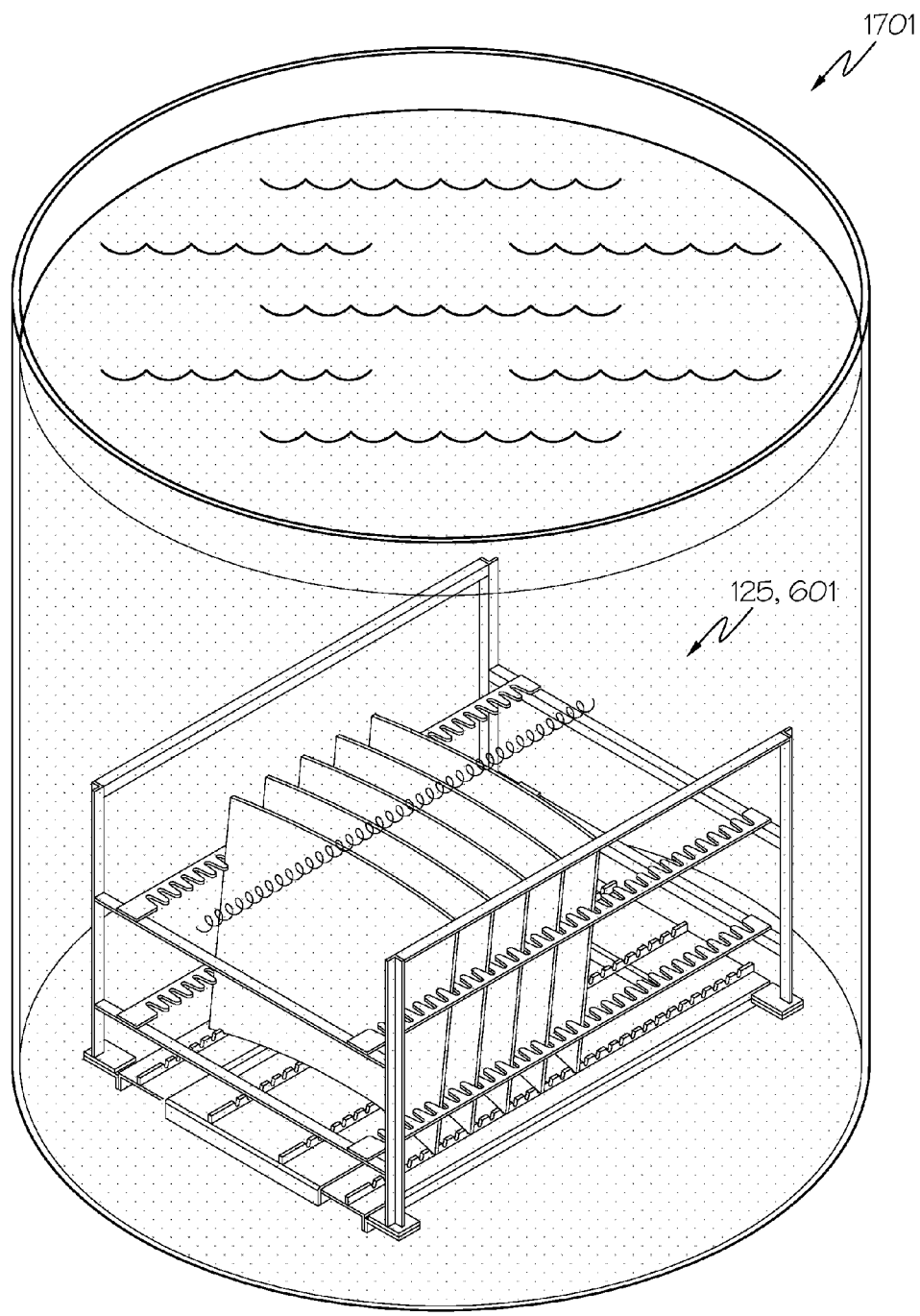
FIG. 17 is a schematic view of methods of post processing the glass sheet.
Figure 18:
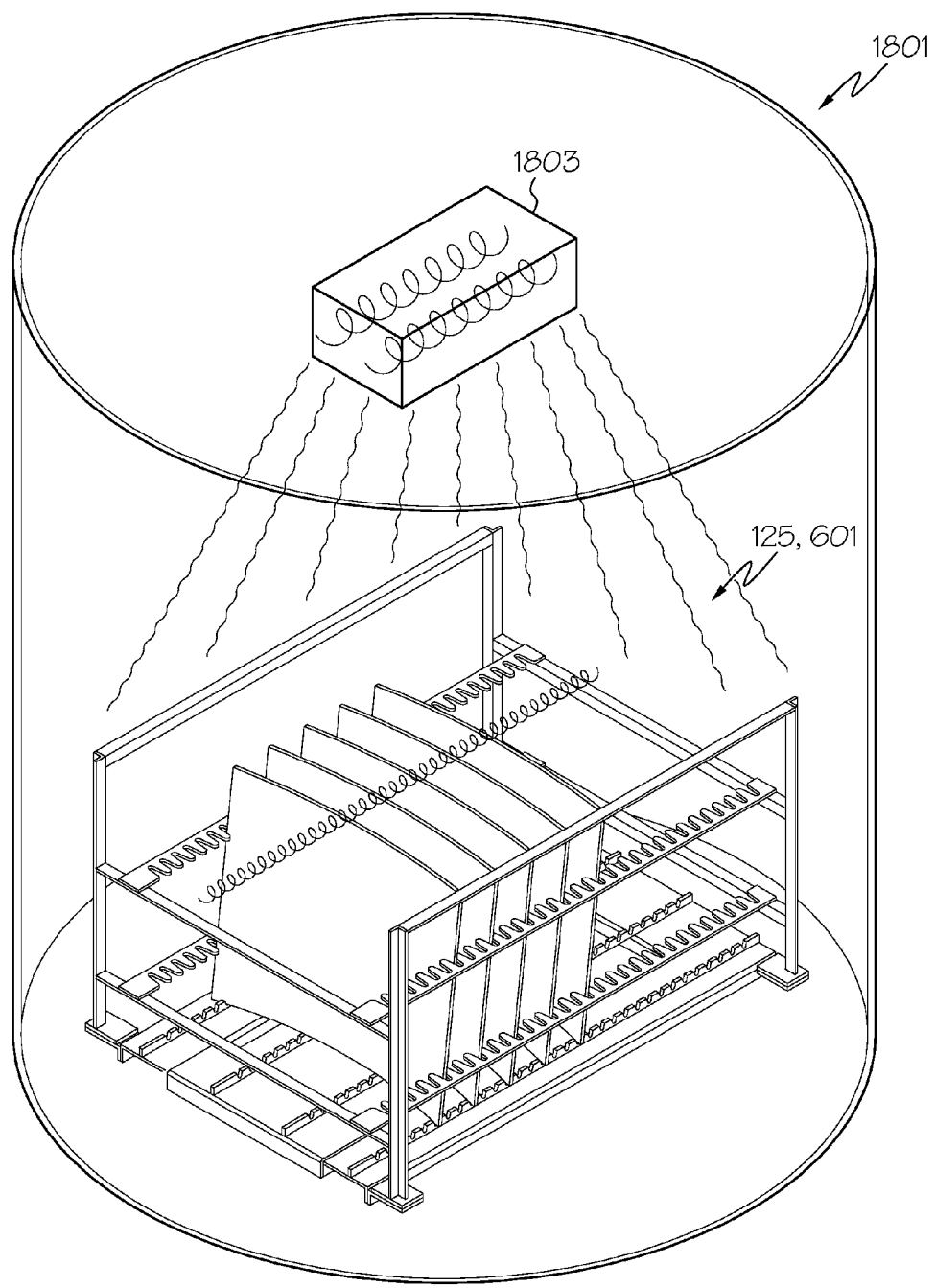
FIG. 18 is a schematic view of further methods of post processing the glass sheet.
Figure 19:
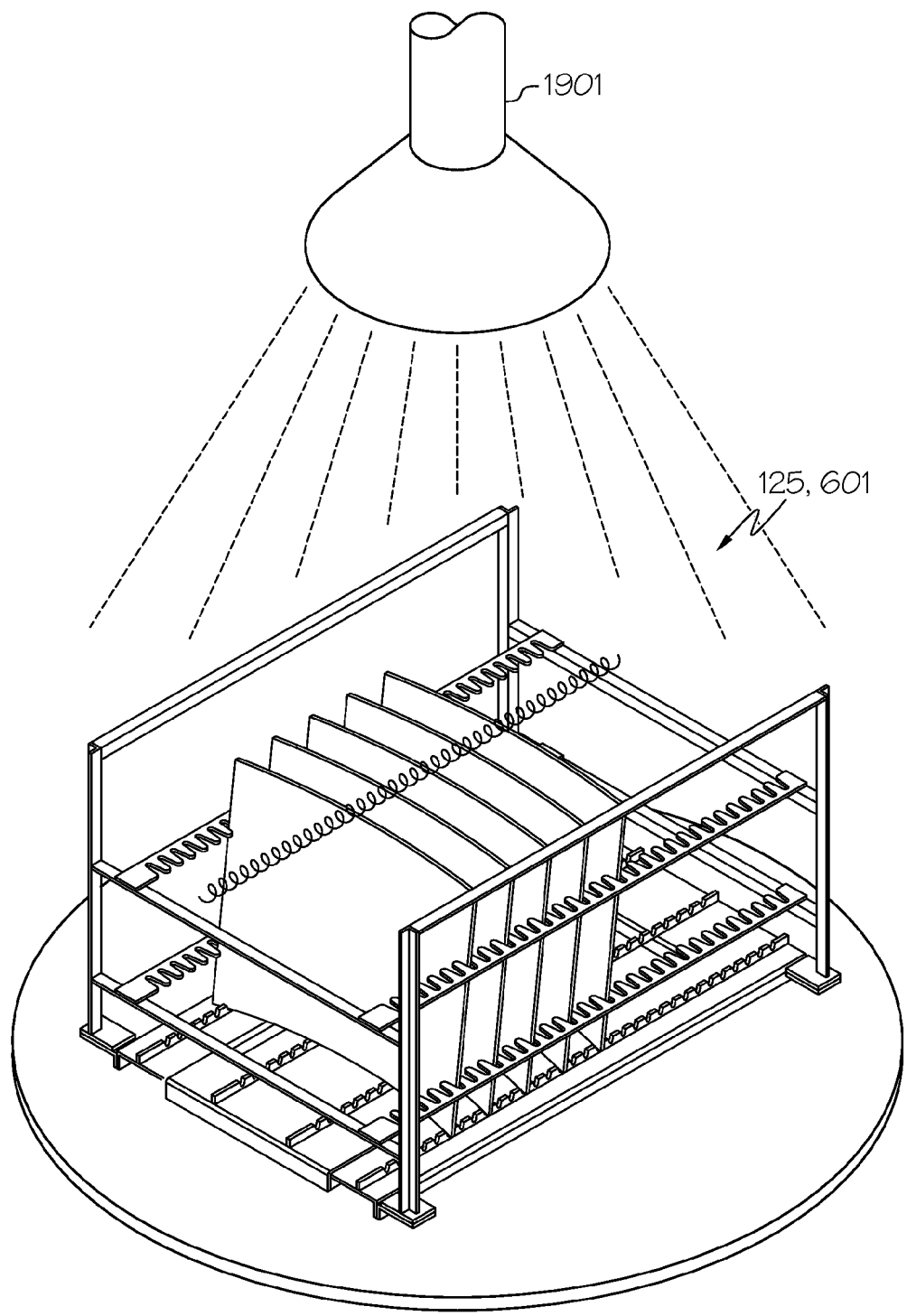
FIG. 19 is a schematic view of still further methods of post processing the glass sheet.

In accordance with each of the embodiments discussed above, once the glass sheet is flexed into the secondary shape (e.g., bent shape, flat shape, etc.) from the initial shape, the method can further include the step of post processing the glass sheet while biasing the glass sheet into the secondary shape with or without a rack. In one example, post processing can comprise the step of chemical strengthening of the glass sheet 101. For example, as shown in FIG. 17, the method can include the step of submerging the glass sheet 101 within a liquid bath 1701 comprising a salt bath during an ion-exchange process. In an alternative example, FIG. 17 can also represent a liquid bath 1701 comprising an acid bath for acid etching portions or the entire surface of the glass sheets. FIG. 18 illustrates a schematic view of another example post processing step of drying or heating the glass sheets within a heating chamber 1801 including a heating device 1803. FIG. 19 schematically illustrates another example post processing step including a fluid dispensing device 1901. In one example, the fluid dispensing device 1901 may comprise an air jet configured to dry the glass sheets during the post processing step. In another example, the fluid dispensing device 1901 may comprise a water or cleaning solution device configured to dispense water or cleaning solution during a rinsing and/or washing step. In another example, the fluid dispensing device 1901 can comprise a coating device configured to deliver a liquid or other coating to the glass sheets.

The tilt angle of the glass sheets 101 may be preselected to help reduce damage during the post processing procedure. For example, the method can include the step orienting the glass sheet such that an angle between the length of the glass sheet and a vertical axis is from about 0° to about 5°, such as greater than 2° and less than or equal to about 5°. Indeed, as shown in FIGS. 2, 7, 13 and 15 the glass sheet can be supported at an angle of about 0° between an axis along the length of the glass sheet and the vertical axis extending along the direction of gravity. As shown schematically in FIGS. 5, 12, 14 and 16, the glass sheet can also be supported at an angle "A" measured between the axis along the length and the vertical axis of about 5° although other positive angles greater or less than 5° angles used in accordance with the present disclosure. As such, the glass sheet can be supported such that the concave second major surface 203, 707 of the glass sheet 101 either faces substantially orthogonal with respect to the vertical axis extending in the direction of gravity or downward relative to the vertical axis. Advantageously, such a position can avoid force concentrations that would otherwise result if the glass sheets were tilted concave upward. For example, orienting the concave second major surface to face either orthogonal with respect to the vertical axis extending in the direction of gravity or downward relative to the vertical axis can avoid pooling of the liquid from the salt bath to travel along a central area of the concave surface that would otherwise occur if the concave surface faced upwardly. Rather, the liquid from the salt bath would simply flow towards respective lateral edge portions 109, 111 if the convex surface faces upwardly in orientations where the angle "A" is greater than about 0° to about 5°. Pooling can also be avoided by orienting the glass sheet with an angle "A" of about 0° since liquid would simply fall vertically downward in the direction of gravity without pooling.

Once the post processing step is complete, the elastically deformed glass sheet may be released to at least partially, such as entirely, return to the initial shape. For example, with reference to FIGS. 1 and 6, the glass sheet may be removed from the rack 125, 601 by a robot that maintains the glass sheet in the secondary shape (e.g., bent shape) as indicated by arrows 145. Then the shape can be returned to the initial shape as indicated by arrows 147. Otherwise, as indicated by arrows 149, the glass sheet can be removed from the rack to the initial shape without maintenance of the secondary shape. Indeed, with reference to FIG. 1, the central tray 135 may be shifted in direction 137b to release the glass sheet to at least partially return to the initial shape. Likewise the shape rails 603a, 605a may be shifted along direction 611b and/or the shape rails 603b, 605b may be shifted along direction 613b to release the glass sheet to at least partially return to the initial shape.

It will be apparent to those skilled in the art that various modifications and variations can be made without departing from the spirit and scope of the claimed invention.

What is claimed is:

1. A method of post processing at least one flexible glass sheet including a thickness defined between first and second major surfaces of the glass sheet, and an outer periphery defined by first and second lateral edge portions of the glass sheet that span between top and bottom edge portions of the glass sheet, the method comprising the steps of:
   (I) providing the glass sheet with an initial shape; then
   (II) flexing the glass sheet into a secondary shape from the initial shape; then
   (III) post processing the glass sheet while biasing the glass sheet into the secondary shape; and then
   (IV) releasing the glass sheet to at least partially return to the initial shape,
   wherein the glass sheet is supported with a rack that biases the glass sheet into the secondary shape during step (III).

2. The method of claim 1, wherein the secondary shape comprises a bent shape.

3. The method of claim 1, wherein the post processing of step (III) includes a processing step selected from the group consisting of: chemical strengthening, drying, washing, rinsing, coating, and acid etching the glass sheet.

4. The method of claim 1, wherein the step (II) of flexing is performed prior to the step of supporting the glass sheet with the rack.

5. The method of claim 1, wherein the rack is used to flex the glass sheet into the secondary shape during step (II).

6. The method of claim 1, wherein at least one glass sheet comprises a plurality of glass sheets, and wherein the method further comprises the step of spacing each of the plurality of glass sheets with respect to one another along an axis to create an axial stack of glass sheets.

7. The method of claim 1, wherein the secondary shape of step (ii) comprises a shape selected from the group consisting of: a C-shape, an S-shape and a W-shape.

8. The method of claim 1, wherein step (III) includes submerging the glass sheet within a salt bath during an ion-exchange process.

9. The method of claim 1, wherein biasing the glass sheet into the bent shape of step (III) comprises compressing the first and second lateral edge portions toward one another.

10. The method of claim 9, wherein biasing the glass sheet into the secondary shape of step (III) does not include biasing either the top edge portion or the bottom edge portion into a curved shape.

11. The method of claim 1, wherein the secondary shape comprises a bent shape and wherein biasing the glass sheet into the bent shape of step (III) comprises biasing at least one of the top edge portion and the bottom edge portion into a curved shape.

12. The method of claim 11, wherein biasing the glass sheet into the bent shape of step (III) does not include compressing the first and second lateral edge portions toward one another.

13. The method of claim 1, wherein the rack compresses the first and second lateral edge portions toward one another to bias the glass sheet into the secondary shape during step (III).

14. The method of claim 13, wherein the top and bottom edge portions are not engaged by the rack to facilitate biasing of the glass sheet into the secondary shape during step (III).

15. The method of claim 1, wherein the rack engages at least one of the top edge portion and the bottom edge portion to bias the glass sheet into the secondary shape during step (III).

16. The method of claim 15, wherein the rack does not compress the first and second lateral edge portions toward one another to facilitate biasing of the glass sheet into the secondary shape during step (III).

17. The method of claim 1, wherein the secondary shape of step (II) comprises a C-shape wherein the first major surface is substantially convex and the second major surface is substantially concave, and the second major surface has a substantially concave lateral profile along a lateral cross section taken between the lateral edge portions of the glass sheet, wherein the substantially concave lateral profile exists along a length of the glass sheet between the top and bottom edge portions of the glass sheet.

18. The method of claim 17, further comprising the step orienting the glass sheet such that an angle between the length of the glass sheet and a vertical axis is from about 0° to about 5°.

19. The method of claim 18, wherein the step of orienting the glass sheet tilts the glass sheet such that the angle is greater than 0° and less than or equal to about 5° with the second major surface of the glass sheet facing downwardly relative to the vertical axis.

20. The method of claim 19, wherein the step of orienting the glass sheet tilts the glass sheet such that the angle is greater than 2° and less than or equal to about 5°.

* * * * *